United States Patent
Oku

(10) Patent No.: US 7,320,024 B2
(45) Date of Patent: Jan. 15, 2008

(54) SYSTEM AND METHOD FOR PROVIDING CONTENTS ON A NETWORK

(75) Inventor: Kazuho Oku, Kyoto (JP)

(73) Assignee: NHN Corporation, Seoul (KR)

( * ) Notice: Subject to any disclaimer, the term of this patent is extended or adjusted under 35 U.S.C. 154(b) by 614 days.

(21) Appl. No.: 09/911,816

(22) Filed: Jul. 24, 2001

(65) Prior Publication Data

US 2002/0010756 A1   Jan. 24, 2002

(30) Foreign Application Priority Data

Jul. 24, 2000   (KR) ...................... 10-2000-0024253

(51) Int. Cl.
*G06F 15/16* (2006.01)
(52) U.S. Cl. ...................... 709/217; 709/202; 709/203; 709/218
(58) Field of Classification Search ................ 709/203, 709/209, 217
See application file for complete search history.

(56) References Cited

U.S. PATENT DOCUMENTS

| | | | |
|---|---|---|---|
| 5,905,736 A * | 5/1999 | Ronen et al. ................ 370/546 |
| 6,144,988 A * | 11/2000 | Kappel ........................ 709/202 |
| 6,438,575 B1 * | 8/2002 | Khan et al. .................. 709/200 |
| 6,463,474 B1 * | 10/2002 | Fuh et al. .................... 709/225 |
| 6,556,997 B1 * | 4/2003 | Levy ........................... 707/10 |
| 6,769,009 B1 * | 7/2004 | Reisman ...................... 709/201 |
| 6,857,102 B1 * | 2/2005 | Bickmore et al. ........ 715/501.1 |
| 7,020,721 B1 | 3/2006 | Levenberg |

FOREIGN PATENT DOCUMENTS

| | | |
|---|---|---|
| CN | 1172568 A | 10/1996 |
| EP | 0 820 183 | 1/1998 |
| EP | 0 908 832 A3 | 4/1999 |
| EP | 0 987 868 | 3/2000 |
| JP | 10-334056 | 12/1998 |
| JP | 11-306067 | 5/1999 |
| JP | 11-175515 | 7/1999 |
| TW | 359926 | 6/1999 |
| TW | 388021 B | 4/2000 |
| TW | 403876 B | 9/2000 |
| TW | 439376 B | 6/2001 |
| WO | WO 00/02389 | 1/2000 |
| WO | 00/25477 | 5/2000 |

\* cited by examiner

*Primary Examiner*—Jason Cardone
*Assistant Examiner*—Nicholas R Taylor
(74) *Attorney, Agent, or Firm*—Occhiuti Rohlicek & Tsao LLP

(57) ABSTRACT

Disclosed is a contents-providing system for receiving contents from a web server and providing the contents to a portable terminal connected via a network that comprises: a user information database for storing user ID information; an authentication server for performing authentication based upon the user ID information by using the user information database when the user ID information and a URL of a web server are input by the portable terminal, and outputting the URL after performing the authentication; and a data server for requesting that the web server corresponding to the URL provided by the authentication server provides the contents, processing the contents provided by the web server into a predetermined format, and transmitting the processed contents to the portable terminal.

20 Claims, 9 Drawing Sheets

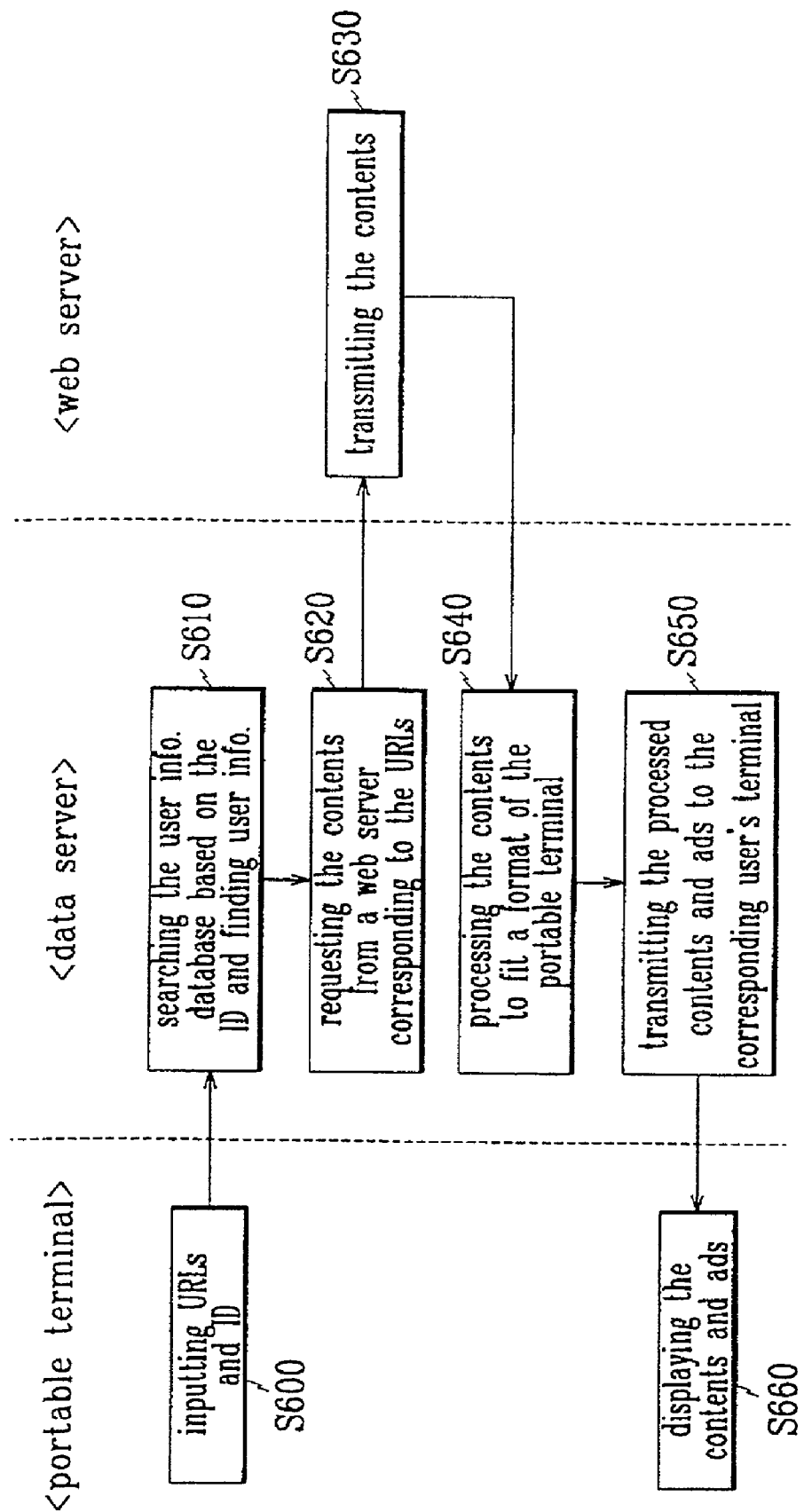

SYSTEM AND METHOD FOR PROVIDING CONTENTS ON A NETWORK

BACKGROUND OF THE INVENTION (a) Field of the Invention

The present invention relates to a system and method for providing contents, and a server and a computer program for configuring the system. More specifically, the present invention relates to a technique for providing contents to a portable terminal via the Internet according to a user's authentication or a fee settlement.

(b) Description of the Related Art

As the Internet has been greatly popularized, contents providers (CP) that provide various contents on the Internet have also increased. Particularly, since transmission speeds of the Internet have become faster, the categories of the contents provided by the contents providers have been expanded to various media such as still images, moving pictures and music, as well as text.

Also, as Internet services that use portable wireless terminals such as mobile phones and personal digital assistants (PDAs) have begun, electronic mail communication and navigation of Internet contents using wireless terminals have increased. Some contents providers provide wireless-terminal-only contents to users who search information using wireless terminals. However, most contents providers provide contents to those who navigate information via ordinary computers and cable networks and not to wireless terminal users.

Wireless terminal users can access general contents providers that focus on computer users and receive desired contents from them, but subsequent problems may occur in the case of accessing a general contents provider using a wireless terminal.

First, computers and wireless terminals respectively have different information sizes, display specifications and storage capacities. Accordingly, when a user receives contents from general contents providers using a portable terminal, the contents can be inappropriately displayed on the terminal.

Second, since the information receipt speed via a wireless terminal is slower than that via a general computer, it takes a long time to receive desired contents from general contents providers via a portable terminal. Particularly, when a user accesses general contents providers that provide contents of large data sizes such as images as well as text, the information receipt speed becomes a bigger problem.

Generally, therefore, users receive desired contents from wireless-terminal-only contents providers via the portable terminals, and accordingly, the range of contents is restricted.

When desiring to receive contents of a specific field (e.g., travel) using a portable terminal, a user must individually access a plurality of web sites that provide the contents of a specific field to get corresponding contents. However, in this case, since communication channel environments are unstable because of characteristics of the wireless Internet, the user's access state may be disconnected, so it takes much time and effort to access the multiple web sites and receive the contents.

SUMMARY OF THE INVENTION

It is an object of the present invention to provide a contents-providing system, method, server and computer program thereof for the receiving of processed contents in optimized states by a wireless terminal.

It is another object of the present invention to provide a contents-providing system, method, server and computer program thereof for conveniently authenticating users and settling fees of the contents provided to wireless terminals.

In one aspect of the present invention, in a system for receiving contents from a web server and providing the contents to a portable terminal connected via a network, a contents-providing system comprises: a user information database for storing user identification (ID) information; an authentication server for performing an authentication based upon the user ID information by using the user information database when the user ID information and a uniform resource locator (URL) of a web server are input by the portable terminal, and outputting the URL after performing the authentication; and a data server for requesting that the web server corresponding to the URL provided by the authentication server provides the contents, processing the contents provided by the web server into a predetermined format, and transmitting the processed contents to the portable terminal.

The user information database stores user information corresponding to the user ID information, the authentication server extracts user information corresponding to the user ID information from the user information database and outputs the same with the URLs when performing authentication based on the user ID information, and the system further comprises a billing server for settling fees for the contents provided by the web servers having the URLs provided by the portable terminal based on the user information provided by the authentication server.

The billing server settles the respective fees of the web servers respectively corresponding to the channel URLs when the URLs provided by the portable terminal are channel URLs, the data server transmits the settlement results to the respective web servers corresponding to the channel URLs when the settlement results of the billing server are provided, and the respective web servers determine the settlement results and when the settlement of the fees is performed, the web servers provide the corresponding contents to the data server.

In another aspect of the present invention, in a contents-providing method of a system for receiving contents from a plurality of web servers and providing the contents to a portable terminal connected via a network, a contents-providing method comprises: (a) extracting user information corresponding to user ID information and authenticating the user when the user ID information and a URL of a web server for providing the contents are input by the portable terminal; (b) determining whether the URL is a channel URL that is of a set of URLs of a plurality of web servers that provide contents of a predetermined field; (c) requesting that the respective web servers corresponding to the respective channel URLs provide the contents; (d) reducing image sizes of the contents or reducing a number of colors so as to convert them according to a specification of the portable terminal when the contents are provided by the respective web servers according to the request; and (e) transmitting the converted contents to the portable terminal via the network.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 10 shows an operation of the contents-providing system according to the fourth preferred embodiment of the present invention.

DETAILED DESCRIPTION OF THE PREFERRED EMBODIMENTS

In the following detailed description, only the preferred embodiments of the invention have been shown and described, simply by way of illustration of the best modes contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
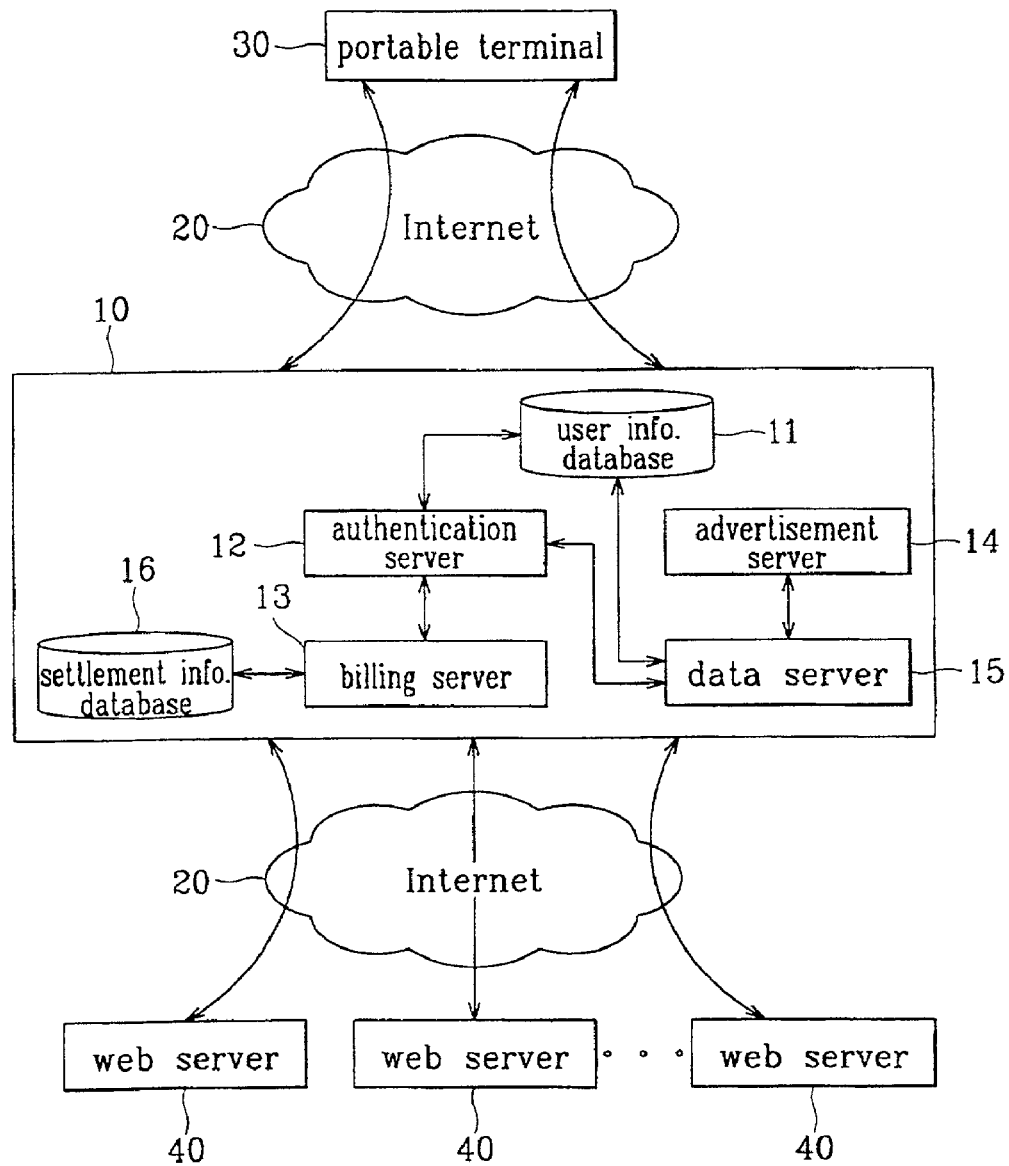
FIG. 1 shows a contents-providing system according to a first preferred embodiment of the present invention.

FIG. 1 shows a contents-providing system according to a first preferred embodiment of the present invention.

As shown, the contents-providing system 10 is connected to a portable terminal 30 and a plurality of web servers 40 that respectively provide contents via the Internet 20 (including a future network).

The web servers 40 are respectively those of contents providers that provide contents via the Internet 20, and at least one of the web servers 40 provides contents for general computers.

The contents-providing system 10 for processing the contents provided by the web servers 40, transmitting the contents to the portable terminal 30, and settling the corresponding fee for the transmitted contents, comprises: a user information database 11; an authentication server 12; a billing server 13; an advertisement server 14; a data server 15; and a settlement information database 16.

Identical with subsequent preferred embodiments, the user information database 11, the authentication server 12, the billing server 13, the advertisement server 14 and the data server 15 are configured by executing predetermined programs in a computer, and may be configured as individual devices, or some of the servers may be configured as identical computers.

The user information database 11 stores information on members who can receive desired contents-providing services. The information includes names, identifications (ID) for log-in, passwords, credit card numbers or account numbers (including the numbers of bank accounts and cyber-money accounts), sex, ages, occupations, hobbies, electronic mail addresses, addresses, mobile phone numbers, telephone numbers and residence registration numbers as well as electronic commerce information and information on advertisements previously transmitted via the data server.

The settlement information database 16 stores settlement information on the fees for the contents provided to the portable terminal 30 such as IDs for discriminating the web servers 40 (referred to as a site IDs hereinafter) that provide the contents for the respective user IDs, the contents fees, settlement price and settlement methods (e.g., credit card numbers).

The authentication server 12 determines whether the user information database 11 stores the user information (e.g., an ID) provided by the portable terminal 30, and authenticates whether the corresponding user is a member who can receive the contents-providing service according to determination results.

The billing server 13 settles the contents-providing fee of the authenticated user. For example, the billing server 13 provides the user's credit card number to the corresponding credit card company to request a settlement approval on the contents-providing fee, and provides approval results to the authentication server 12.

The advertisement server 14 has various advertisement contents, and provides specific advertisement contents to the data server 15 according to the data server's request. Particularly, the advertisement server 14 provides the advertisement contents that fit the users' ages, sex and education levels to the data server 15 according to the user information provided by the data server 15.

Figure 2:
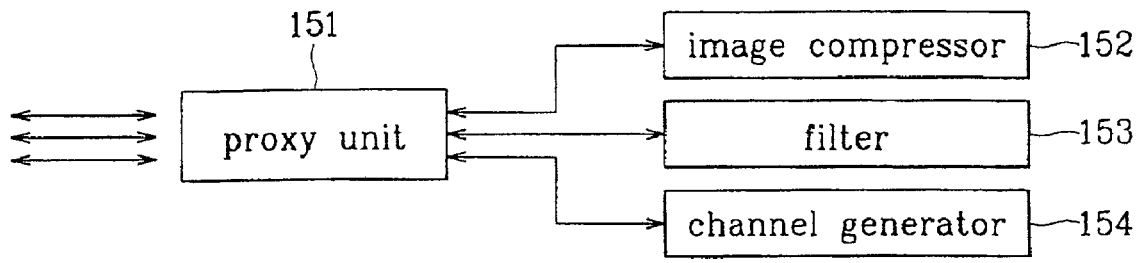
FIG. 2 shows a data server of FIG. 1.

The data server 15 processes the contents provided by the web server 40 so that the portable terminal 30 may receive the appropriate contents, and also transmits the advertisement contents provided by the advertisement server 14, such as the processed contents, to the portable terminal 30 so that the advertisement may be effectively displayed. FIG. 2 shows the detailed data server.

As shown, the data server 15 comprises a proxy unit 151, an image compressor 152, a filter 153, and a channel generator 154.

The image compressor 152 receives image information of the contents provided by the web server, reduces image sizes and number of colors and compresses the images so as to fit the image information to the portable terminal. In this instance, since the portable terminals as well as the PDA and portable phones have different image display sizes, the image compressor 152 reduces image sizes and number of colors and compresses the images according to the image sizes of the portable terminals.

The image compressor 152 can either reduce image sizes, reduce the number of colors or compress the images, and it can modify the images to fit the display capacity of the portable terminal by image compression or color reduction and concurrently increase the contents transmission speed, or it can increase the contents transmission speed just by image compression. Also in the present invention, music files can be transmitted to the portable terminal, and in this case, a function unit for reducing or compressing the music data together with or instead of the image compressor 152 needs to be installed.

For example, to execute a process according to the image sizes of the portable terminal, that is, to perform a process according to a contents output performance or a contents communication performance of a portable terminal, a table that matches user IDs with performance specifications of the users' portable terminals is previously provided to the image compressor 152, the performance specification of the portable terminals being detected based on the user ID that is input when the user requests desired contents, and subsequent parameters are established.

The filter 153 filters information that is not appropriate for or needed to be provided to the portable terminal (e.g., moving picture information or advertisements) from the image information provided by the web server 40.

The channel generator 154 binds a plurality of contents respectively provided by a plurality of web servers or a single web server into a single channel. For example, the channel generator 154 respectively receives travel contents from multiple web servers that provide travel information, and binds the travel information contents into a travel channel.

The proxy unit 151 monitors the information that passes through the data server 15 and calls the image compressor 152, the filter 153 and the channel generator 154.

In detail, when finding image information while monitoring the information that passes through the data server 15, the proxy unit 151 calls the image compressor 152 to reduce the image sizes, reduce the number of colors, or compress the images according to the established parameters. In this instance, the parameters are determined according to the display specifications of the user's portable terminal, or the user can directly set the parameters.

The proxy unit 151 checks whether a required uniform resource locator (URL) is designated for a channel, and when the URL is found to be designated for a channel (i.e., when an input URL is a channel URL), the proxy unit 151 calls the channel generator 154. Here, the channel URL is of a set of URLs to be bound into a channel. For example, when the URLs of the web servers that provide travel contents are respectively http://www.travel.com, http://www.picnic.com and http://www.travelers.com, the set of these URLs corresponds to the travel channel.

According to the preferred embodiment, a process of inputting the channel URLs is implemented as follows. The portable terminal 30 has a set of icons that display various channels such as newspapers, books, discs, sports, travel, game, movies, stocks and weather. These icons have channel URL information.

Therefore, when a user clicks the travel icon of the portable terminal 30, the channel URLs of the travel icon, that is, the URL information such as http://www.travel.com, http://www.picnic.com and http://www.travelers.com is transmitted to the contents-providing system 10.

The proxy unit 151 controls transmission timing of respective streams of web pages (e.g., an HTML that includes pictures) that include a plurality of streams. For example, in the case of a web page that has both text and pictures, the proxy unit 151 initially transmits the text and then the picture information.

The portable terminal 30 comprises a portable wireless terminal such as a PDA or a mobile phone, and has icon information on the various channels. This icon information can be downloaded from the contents-providing system 10, or directly created on the portable terminal. The portable terminal may have a program for creating or editing the channel icon information. Particularly, the user can download the channel icon information to the portable terminal 30 from the contents-providing system 10, or the user can directly make desired channel icons using a PC that has a channel icon-making program and receive channel icon information from the PC. Hence, the portable terminal can have a program for decompressing the contents compressed by the data server.

Figure 3:
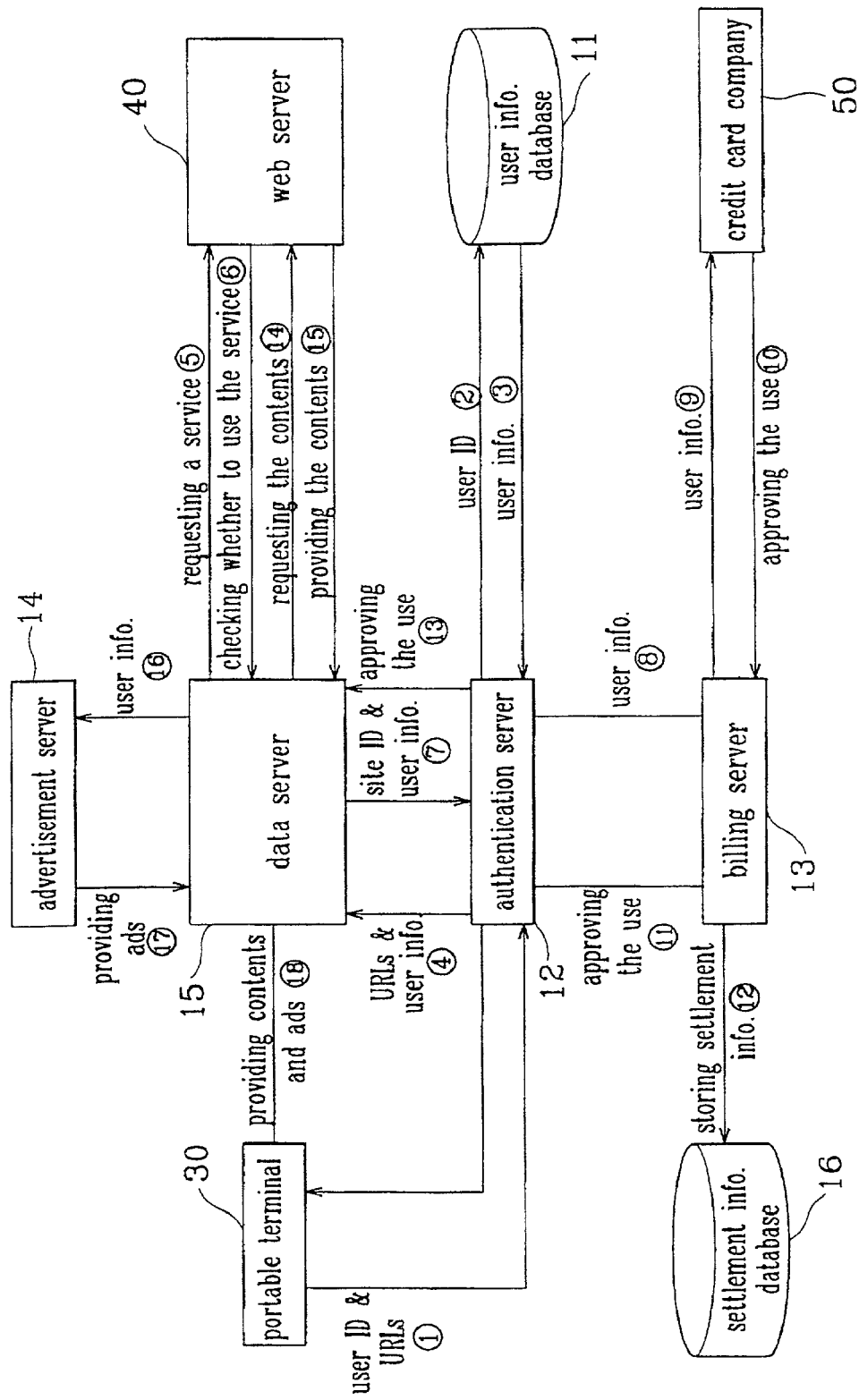
FIG. 3 shows an operation of respective units of the contents-providing system according to the first preferred embodiment of the present invention.

The contents-providing system according to the first preferred embodiment of the present invention provides the contents provided by the web server 40 to the portable terminal for a predetermined fee. FIG. 3 shows an operation of respective units of the contents-providing system according to the first preferred embodiment, and FIG. 4 shows an operation of the contents-providing system.

Figure 4:
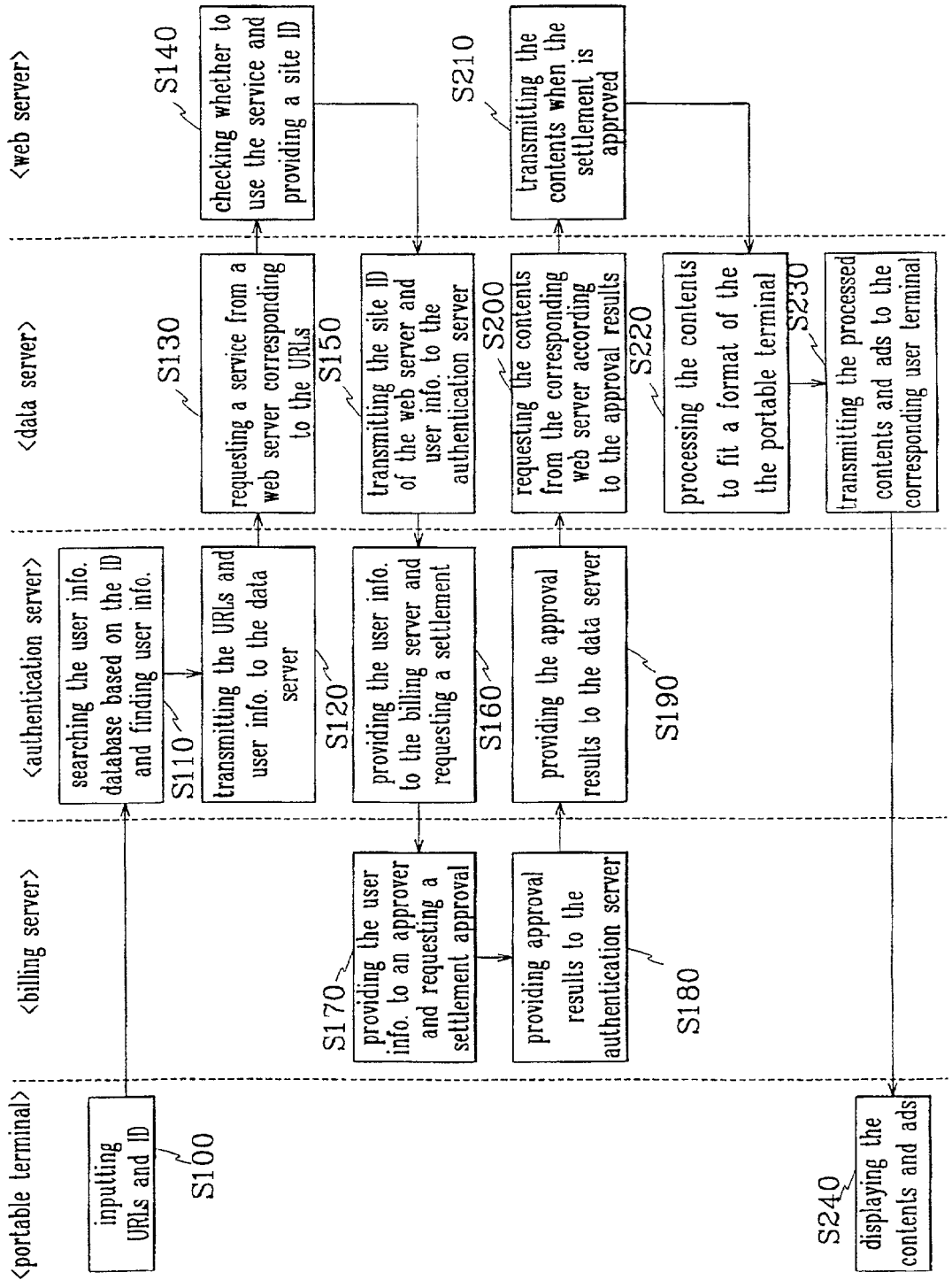
FIG. 4 shows an operation of the contents-providing system according to the first preferred embodiment of the present invention.

Referring to FIGS. 3 and 4, an operation of the contents-providing system according to the first preferred embodiment will now be described.

As shown, a user accesses the authentication server 12 of the contents-providing system 10 via the portable terminal 30, and selects or inputs channel URLs. In this instance, the input step can be performed by clicking a channel icon of the portable terminal 30. The user inputs an ID for authentication to the portable terminal 30, and the ID is transmitted to the authentication server 12 in step S100.

The authentication server 12 searches the user information database 11 according to the ID transmitted by the portable terminal 30 and extracts user information corresponding to the ID in step S110, and provides the channel URLs and user information transmitted by the portable terminal 30 to the data server 15 instep S130.

Also, when the corresponding user ID is not found in the user information database 11, the authentication server 12 refuses the request from the portable terminal 30. In some cases, the authentication server 12 authenticates the request from the user and executes subsequent processes for providing the contents.

The proxy unit 151 of the data server 15 requests contents-providing services from the web servers 40 respectively corresponding to the URLs of the channel URLs in step S140, and accordingly, the respective web servers 40 check service usability states and transmit a site ID to the data server 15 in step S140.

The proxy unit 151 provides the site ID and user information to the authentication server 12 according to the web server's service allowance so as to settle the fee for the contents provided by the web server 40 in step S150.

The authentication server 12 provides the site ID provided by the data server 15 and user information for settling such as a credit card number to the billing server 13 in step S160, and the billing server 13 provides the contents fee together with a settlement such as the user's credit card number to an approver 50 such as a credit card company and requests settlement approval in step S170. In this instance, the billing server 13 separately builds a database that matches the site IDs with the contents fees so as to calculate the fees of the contents provided by the web servers 40, and enables the web servers 40 to provide the fees of the contents provided together with the site ID so that the billing server 13 can perform the settlement process according to the contents fees provided by the web servers 40.

When the approver 50 approves a settlement number and the contents fees provided by the billing server 13, the billing server 13 provides settlement approval results to the data server 15 via the authentication server 12 in steps S180 and S190.

The data server 15 transmits the settlement approval results to the web servers 40 that have corresponding site IDs in step S200, and the respective web servers 40 transmit the respective contents corresponding to the URLs to the data server 15 when the settlement is approved in step S210. When the settlement is not approved, the web servers 40 do not provide the contents to the data server 15.

The data server 15 requests advertisement contents from the advertisement server 14, and in this instance, the proxy unit 151 of the data server 15 provides the user information provided by the authentication server 12 to the advertisement server 14 so that the advertisement server 14 may transmit the advertisement contents that are appropriate for the user information.

The proxy unit 151 of the data server 15 transmits the contents provided by the web servers 40 and the advertisement server 14 to the filter 153 so as to filter information that is not appropriate or needed to be provided to the portable terminal. After the filtering process by the filter 153, the proxy unit 151 calls the image compressor 152, and then reduces the image sizes and the number of colors, or compresses the images to convert the contents in step S220.

After this, the proxy unit 151 calls the channel generator 154 and binds the converted respective contents into a channel. In this instance, the channel generator 154 inserts the advertisement contents provided by the advertisement server 14 into the contents processed in the previous step S220 or makes them into an additional page to bind them into the channel. After this, the proxy unit 151 transmits the bound contents to the portable terminal 30 via the Internet 20 in steps S230 and S240.

When the converted contents include a plurality of streams, the proxy unit 151 controls the transmission timing of the respective streams and transmits the converted contents.

In the above-described first preferred embodiment, only when the user's settlement approval is executed via the authentication server and the billing server are the contents provided to the user's portable terminal from the web servers, and accordingly, the settlement process initiated by providing the contents is accurately performed.

Also, since the advertisement contents based on the user information provided by the advertisement server are inserted into the contents provided by the respective web servers to be bound to a channel, and the bound information is transmitted to the portable terminal at one time, advertisement impacts are maximized.

In the above-described preferred embodiment, a plurality of URLs are input by the portable terminal, and the contents are obtained from the respective web servers corresponding to the URLs, and identically with the subsequent preferred embodiments, when a single URL is input by the portable terminal and the contents are obtained from the corresponding respective web servers, necessary steps of authentication, settlement, contents processing, filtering, and binding into a channel are executed.

A contents-providing system and method according to a second preferred embodiment of the present invention will now be described.

Figure 5:
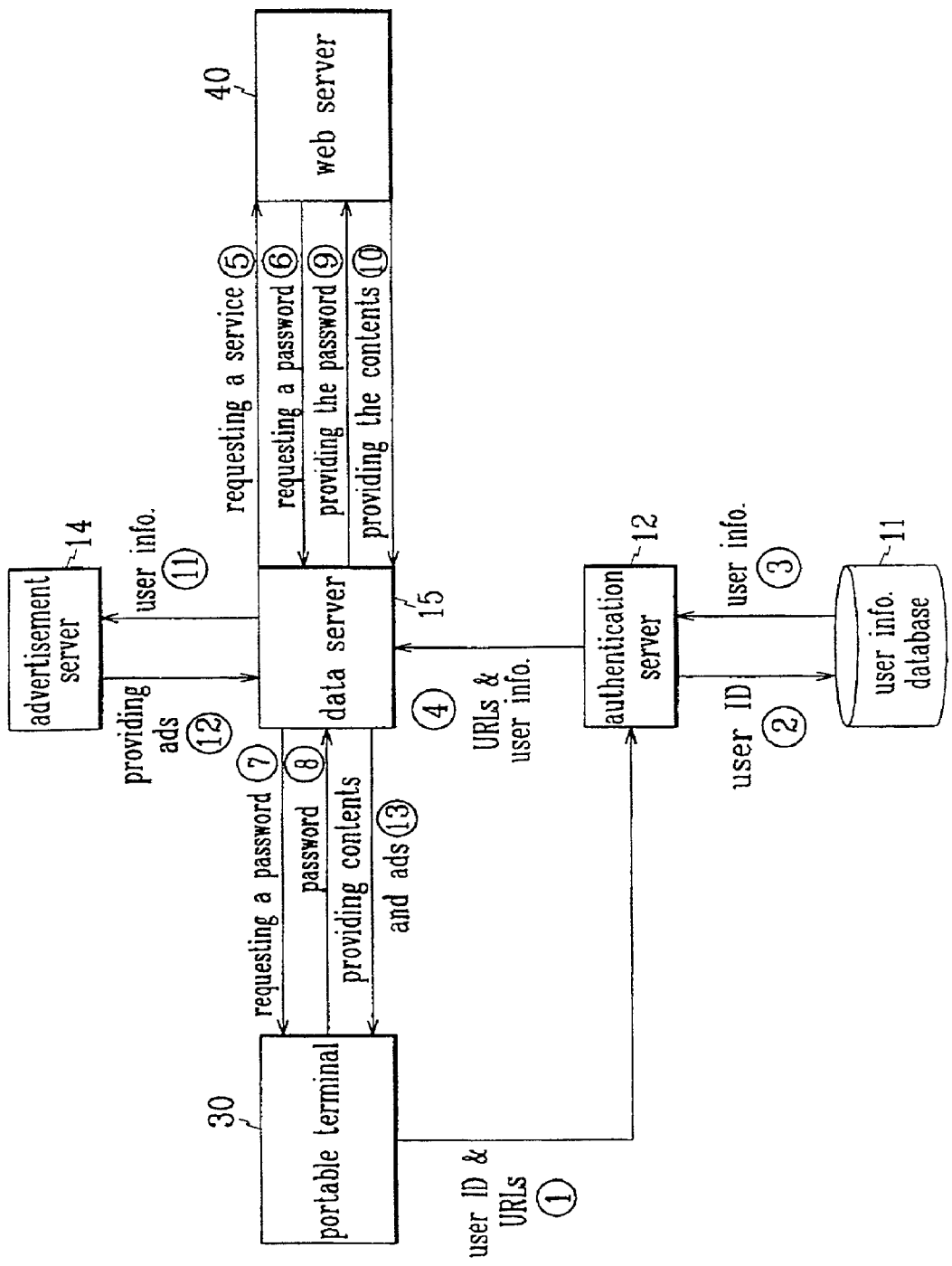
FIG. 5 shows an operation of respective units of a contents-providing system according to a second preferred embodiment of the present invention.
Figure 6:
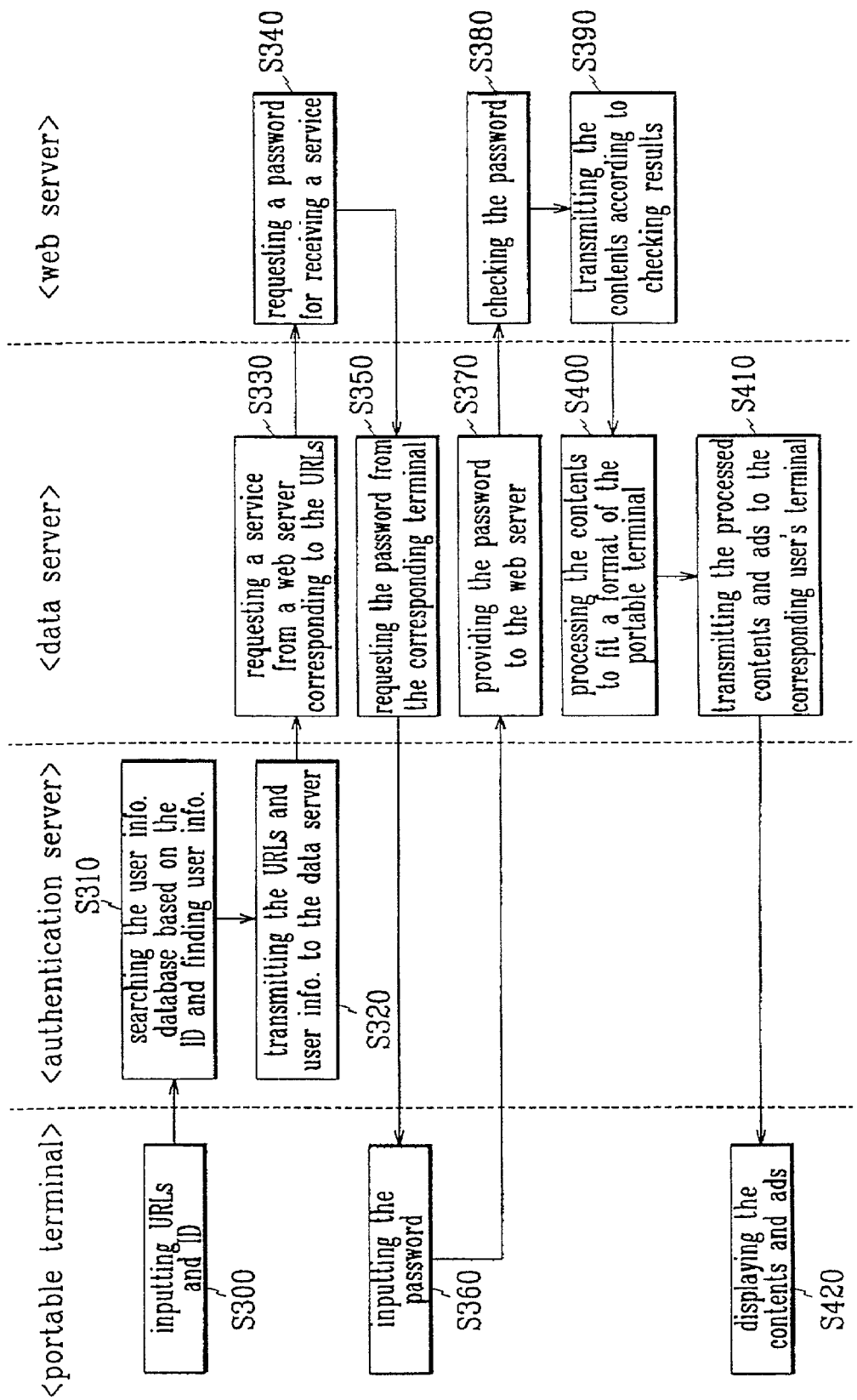
FIG. 6 shows an operation of the contents-providing system according to the second preferred embodiment of the present invention.

FIG. 5 shows an operation of respective units of a contents-providing system according to a second preferred embodiment of the present invention, and FIG. 6 shows an operation of the contents-providing system according to the second preferred embodiment of the present invention.

As shown in FIG. 5, the contents-providing system 10 according to the second preferred embodiment is identical with that of the first preferred embodiment excluding the billing server, and the authentication server 12 performs the authentication process. In the second preferred embodiment, the user is registered as a charged member who can receive the contents of the respective web servers 40, and accordingly, each web server 40 determines whether the user who requested the contents is registered as a charged member, and settles the fee generated by providing the contents. To authenticate the charged members, each web server 40 can comprise a database for storing the users' (who are registered as members) ID and passwords.

An operation of the contents-providing system according to the second preferred embodiment of the present invention will now be described with reference to FIGS. 5 and 6, and operations identical with those of the first preferred embodiment will not be described.

As shown in FIG. 6, a user accesses the authentication server 12 of the contents-providing system 10 via the portable terminal 30, and selects or inputs channel URLs and inputs an ID in step S300. In this instance, the channel URLs can be input by clicking the channel icon of the portable terminal 30.

The authentication server 12 searches the user information database 11 based upon the ID, finds user information, provides the user ID, URLs and user information to the data server 15, and the proxy unit 151 of the data server 15 transmits the user ID to the web servers 40 corresponding to the respective URLs of the channel URLs and requests a contents-providing service in steps S310 to S330.

Each web server 40 requests a password for membership authentication so as to provide the contents to users registered as charged members, and accordingly, the proxy unit 151 of the data server 15 requests a password input from the corresponding user's portable terminal 30 in steps S340 and S350.

Also, a password as well as the URLs and IDs in the previous step S300 can be previously input.

When password input is requested from the data server 15, the user provides a password for membership authentication on the web server 40 to the data server 15 via the portable terminal 30, and the proxy unit 151 transmits the password and the user ID transmitted by the portable terminal 30 to the corresponding web server 40 in steps S360 and S370.

Next, the web server 40 searches its database based upon the user ID and the password transmitted by the data server 15, and only when the password corresponding to the user ID is matched with the password transmitted by the data server 15 does the web server 40 determine that the user is registered as a charged member who can receive desired contents, and it then provides the requested contents to the data server 15 in steps S380 and S390.

Thereafter, the data server 15 processes the contents provided by the web server 40 and the advertisement contents provided by the advertisement server 14 to fit the portable terminal's format, and transmits them to the corresponding user's portable terminal 30 in steps S400 to S420.

After this, the web server 40 settles the fee for the contents provided to the user authenticated as a charged member.

According to the contents-providing system according to the second preferred embodiment, the contents provided by the web server can be charged and provided to the portable terminal without performing an additional settlement process generated by providing the contents, and since the contents are provided to the web server's members and the authenticated users, the settlement generated by providing the contents can be accurately performed.

Differing from the first and second preferred embodiments, a case for providing the contents provided by the web server for free will now be described.

Figure 7:
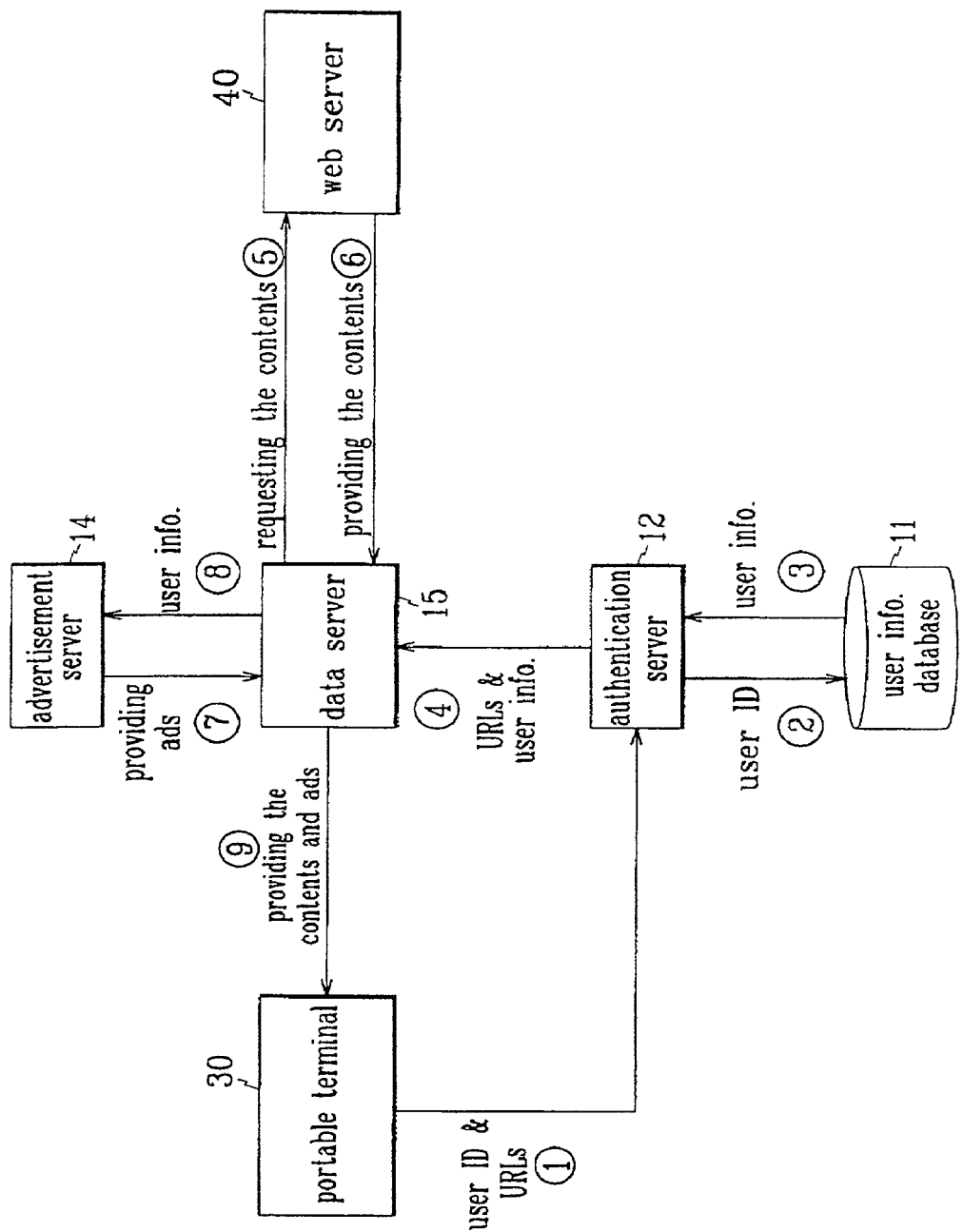
FIG. 7 shows an operation of respective units of a contents-providing system according to a third preferred embodiment of the present invention.
Figure 8:
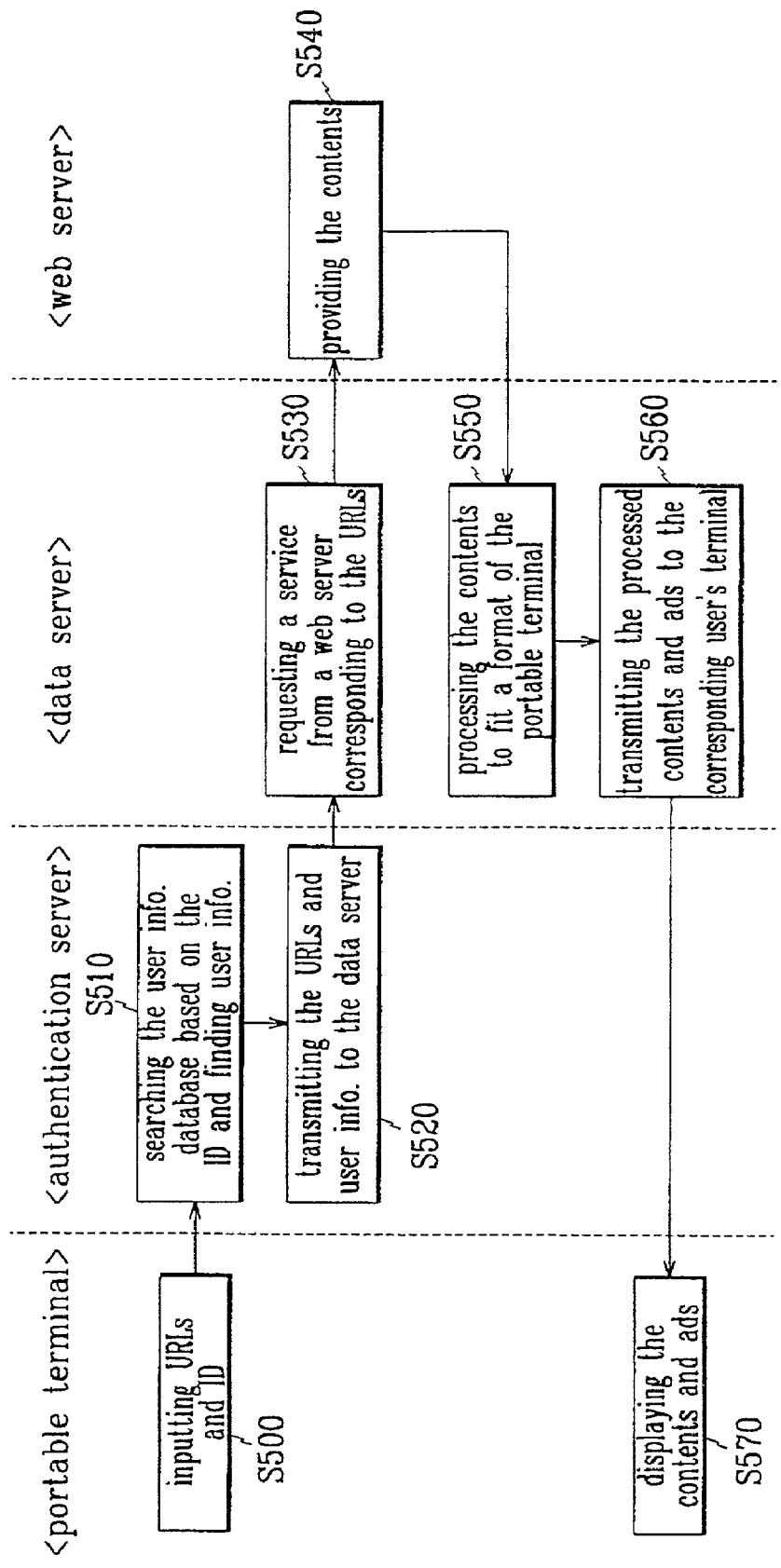
FIG. 8 shows an operation of the contents-providing system according to the third preferred embodiment of the present invention.

FIG. 7 shows an operation of respective units of a contents-providing system according to a third preferred embodiment of the present invention, and FIG. 8 shows an operation of the contents-providing system according to the third preferred embodiment of the present invention.

As shown in FIG. 7, the contents-providing system according to the third preferred embodiment is identical with that of the first preferred embodiment excluding the billing server and settlement information database. Also, the web server 40 does not perform a process for checking charged member states.

When a user who is authenticated as a member inputs a contents request to the authentication server 12, the contents-providing system receives the contents from the corresponding web server 40 without an authentication process for settlement and transmits the contents to the user's portable terminal 30.

In detail, as shown in FIG. 8, when the user accesses the authentication server 12 of the contents-providing system 10 via the portable terminal 30, selects or inputs channel URLs and inputs an ID in step S500, the authentication server 12 searches the user information database 11 based upon the ID, finds user information, and provides the user ID, URLs and user information to the data server 15 in steps S510 and S520.

The data server 15 requests the contents from the web servers 40 corresponding to the respective URLs of the channel URLs, and when a contents request is input by the data server 15, the web server 40 immediately transmits the contents to the data server 15 without an authentication process in steps S530 and S540.

Accordingly, the data server 15 processes the advertisement contents provided by the advertisement server 14 and the contents provided by the web server 40 according to user information, and transmits the processed contents to the corresponding user's portable terminal 30 in steps S550 to S570.

Hence, the user can receive desired various contents without paying a fee for the provided contents.

Differing from the third preferred embodiment, the data server alone can authenticate members who can receive the contents-providing service without using the authentication server.

Figure 9:
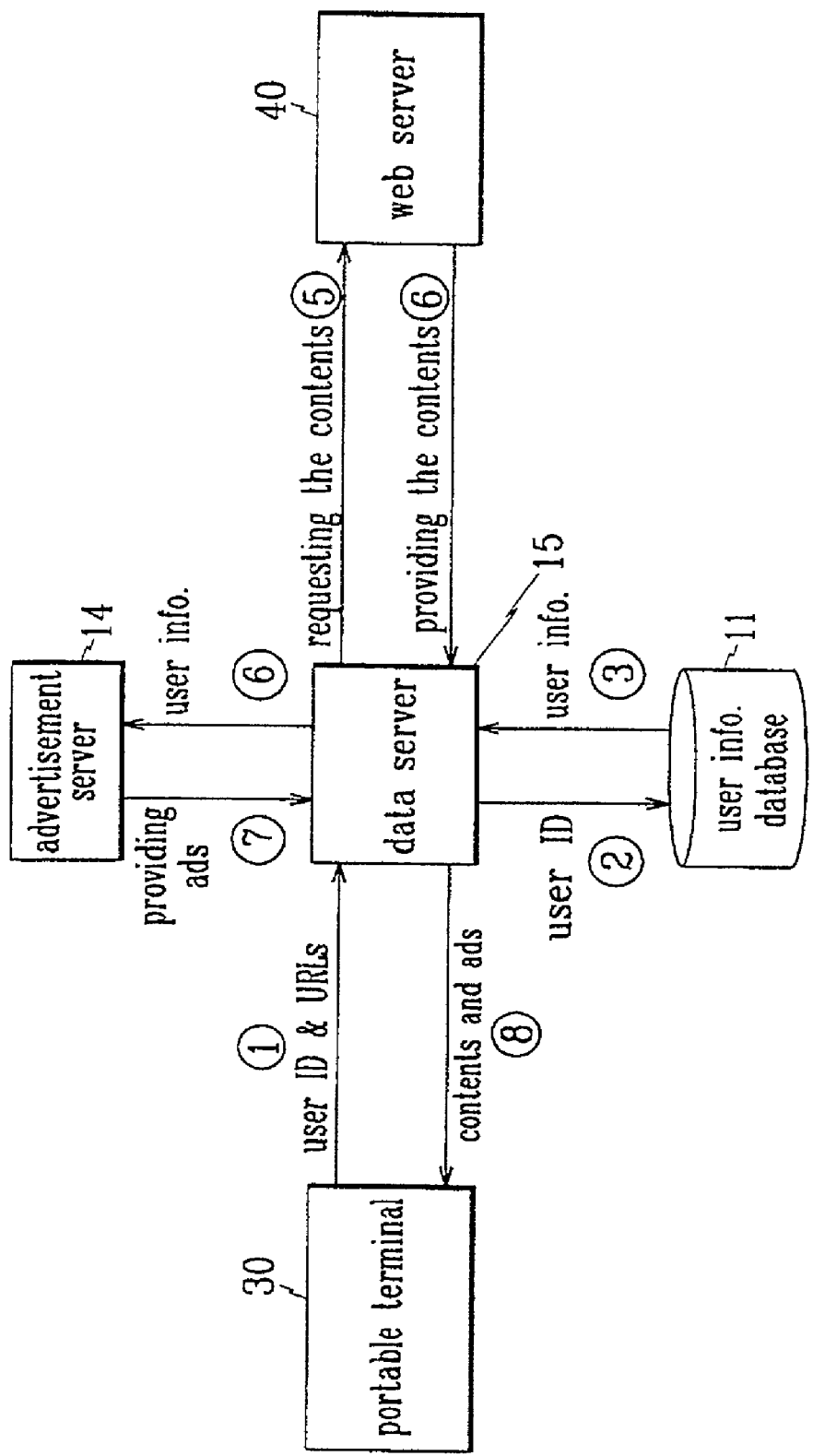
FIG. 9 shows an operation of respective units of a contents-providing system according to a fourth preferred embodiment of the present invention.

FIG. 9 shows an operation of respective units of a contents-providing system according to a fourth preferred embodiment of the present invention, and FIG. 10 shows an operation of the contents-providing system according to the fourth preferred embodiment of the present invention.

As shown in FIG. 9, the contents-providing system according to the fourth preferred embodiment is identical with that of the third preferred embodiment excluding an authentication server, and the data server directly authenticates the members based on the ID provided by the user's portable terminal.

In detail, as shown in FIG. 10, when the user accesses the data server 15 of the contents-providing system 10, selects or inputs channel URLs and inputs an ID in step S600, the proxy unit 151 of the data server 15 searches the user information database 11 based upon the ID, finds user information, and requests that the web servers 40 corresponding to the respective URLs of the channel URLs provide the contents in steps S610 and S620.

When the user ID (i.e., user information) is not found in the user information database, the proxy unit 151 refuses authentication and does not provide the contents.

Accordingly, when the data server 15 requests the contents, the web server 40 directly transmits the contents to the data server 15 without an additional authentication process in step S630, and the data server 15 processes the advertisement contents provided by the advertisement server 14 and the contents provided by the web server 40 according to user information in the same manner as in the first preferred embodiment, and transmits the processed contents to the corresponding user's portable terminal 30 in steps S640 and S650.

Therefore, the data server alone can authenticate the members who can access the contents-providing service without using an additional authentication server, and it provides the contents only to the authenticated user's portable terminal, and the user can receive desired various contents without paying a fee for the provided contents.

In the above-described preferred embodiments, when the user inputs the channel URLs or a single URL via the portable terminal, the member authentication, the contents provision, and the settlement of the contents fee are executed.

While this invention has been described in connection with what are presently considered to be the most practical and preferred embodiments, it is to be understood that the invention is not limited to the disclosed embodiments, but, on the contrary, is intended to cover various modifications and equivalent arrangements included within the spirit and scope of the appended claims.

For example, the portable terminal can be a PDA, portable phone or other types of terminals. Also, orders of filtering, contents compression, and binding into a channel can be changed if necessary.

The contents providers can provide the contents via various types of networks in addition to the Internet.

According to the Internet service device of the present invention, since the contents provided by the web servers are converted according to the parameters of the portable terminal and then transmitted, the user of the portable terminal can get optimized information from the contents providers that aim at general computer users. In addition, since the contents provided by the web servers are compressed and transmitted, the user can effectively receive information on wireless networks of slow transmission speeds.

Also, since the contents provided by the respective web servers are bound into channels and bound information is transmitted to the portable terminal at one time, the user can get desired contents at one time without individually accessing a plurality of web servers via the portable terminal.

Further, since the contents are provided only to the portable terminals of users whose settlement is authenticated or who are authenticated as charged members by the web servers, correct fees for the contents provided to the users can be settled.

Therefore, since the fee settlement of the web servers that provide the contents is reliable, more web servers that provide contents can participate in this service, and the user can get various categories of contents via the portable terminal.

What is claimed is:

1. In a system for receiving contents from a plurality of web servers and providing the contents to a portable terminal connected via a network, the portable terminal including a plurality of channel icons that respectively have channel URL information of a predetermined subject, and wherein a user selection of a channel icon of the portable terminal causes the respective channel URL to be transmitted from the portable terminal to the system, a contents-providing system comprising:

a user information database for storing user identification (ID) information;
an authentication server for:
   performing authentication based upon the user ID information by using the user information database when two or more uniform resource locators (URLs), which are channel URLs associated with a set of URLS, each URL of the set corresponding to a web server that provides contents of a predetermined subject, and the user ID information are sent from the portable terminal, and
   outputting the two or more URLS after performing the authentication;
a data server for:
   requesting contents from a plurality of web servers associated with the two or more URLs,
   processing the received contents into a predetermined format,
   gathering the contents of the predetermined subject, binding the gathered contents into a single channel, and
   transmitting the single channel of contents to the portable terminal,
wherein the data server further comprises an image compressor for:
   receiving the contents from the web server, and
   reducing image sizes or a number of colors according to a specification of the portable terminal; and
a proxy unit for monitoring data transmitted by the web server, and when the contents transmitted by the web server include image information, calling the image compressor.

2. The system of claim 1, wherein the user information database stores user information corresponding to the user ID information,
   the authentication server extracts user information corresponding to the user ID information from the user information database and outputs the same with the input URLs when performing authentication based on the user ID information, and
   the system further comprises a billing server for settling fees for the contents provided by the web servers having the URLs provided by the portable terminal based on the user information provided by the authentication server.

3. The system of claim 2, wherein:
   the billing server settles the respective fees of the web servers respectively corresponding to the channel URLS when the URLs provided by the portable terminal is one of the channel URLs,
   the data server transmits the settlement results to the respective web servers corresponding to the URLS of the channel URLs when the settlement results of the billing server are provided, and
   the respective web servers determine the settlement results and when the settlement of the fees is performed and provide the corresponding contents to the data server.

4. The system of claim 1, wherein when the data server requests the contents, the web server provides the contents to the data server in the case a user who accesses via the portable terminal is a service user who can receive the contents.

5. The system of claim 4, wherein the data server provides the user ID information provided by the authentication server to a plurality of web servers respectively corresponding to the URLS of the channel URLS, and the respective web servers request a password input for authenticating the service user when the data server requests the contents, and the respective web servers perform authentication via the user's password and the user ID information input via the portable terminal.

6. In a system for receiving contents from web servers and providing the contents to a portable terminal connected via a network, the portable terminal including a plurality of channel icons that respectively have channel URL information of a predetermined subject, and wherein a user selection of a channel icon of the portable terminal causes the respective channel URL to be transmitted from the portable terminal to the system, a contents-providing system comprising:
a user information database for storing user information (ID) information;
a data server for:
   performing authentication based upon user ID information by using the user information database two or more uniform resource locators (URLs), which are channel URLs associated with a set of URLS, each URL of the set corresponding to a web server that provides contents of a predetermined subject, and the user ID information are sent from the portable terminal,
   requesting contents from a plurality of web servers associated with the two or more URLs,
   processing the received contents into a predetermined format, gathering the contents of the predetermined subject, binding the gathered contents into a single channel, and
   transmitting the single channel of contents to the portable terminal, wherein the data server further comprises an image compressor for:
   receiving the contents from the web server, and
   reducing image sizes or a number of colors according to the specification of the portable terminal; and
a proxy unit for:
   monitoring data transmitted by the web server, and
   when the contents transmitted by the web server include image information, calling the image compressor.

7. The system of claim 2, wherein the system further comprises an advertisement server for providing advertisement contents, and wherein the authentication server provides the user information extracted from the user information database to the data server, the advertisement server extracts the advertisement contents according to the user information provided by the data server and provides the advertisement contents to the data server, and the data server processes the advertisement contents provided by the advertisement server and the contents provided by the web server and transmits then to the portable terminal.

8. The system of claim 6, wherein the system further comprises an advertisement server for providing advertisement contents, and wherein the advertisement server extracts the advertisement contents according to the user information provided by the data server and provides the advertisement contents to the data server, and the data server processes the advertisement contents provided by the advertisement server and the contents provided by the web server and transmits them to the portable terminal.

9. The system of claim 1 or 6, wherein the data server processes the contents according to a display specification of the portable terminal and transmits them.

10. The system of claim 1 or 6, wherein the data server further comprises a filter for filtering information that is inappropriate or is not needed for the portable terminal among the contents provided by the web server.

11. The system of claim 1 or 6, wherein the data server further comprises a channel generator for binding a plurality of contents of a predetermined field provided by the web server into a single channel.

12. In a contents-providing method of a system for receiving contents from a plurality of web servers and providing the contents to a portable terminal connected via a network, the portable terminal including a plurality of channel icons that respectively have channel URL information of a predetermined subject, and wherein a user selection of a channel icon of the portable terminal causes the respective channel URL to be transmitted from the portable terminal to the system, a contents providing method comprising:
(a) extracting user information corresponding to user identification (ID) information and authenticating the user when two or more uniform resource locators (URLs), which are channel URLs associated with a set of URLS, each URL of the set corresponding to a web server that provides contents of a predetermined subject, and the user ID information are sent from the portable terminal;
(b) requesting the contents from a plurality of web servers associated with the two or more URLs;
(c) monitoring the contents received from the plurality of web servers in response to the requesting to determine whether any of the received contents include image information, and if any of the received contents include image information, converting the image information by reducing sizes or number of color of images according to standard of the portable terminal;
(d) gathering the contents of the predetermined subject and binding the gathered contents into a single channel of contents; and
(e) transmitting the single channel of contents to the portable terminal via the network.

13. The method of claim 12, wherein the method further comprises respectively settling the fees for the contents provided by the web servers corresponding to the respective URLs based upon the user information.

14. The method of claim 12, wherein when the contents are requested in (b), the settlement results are provided to the web servers corresponding to the respective URLs.

15. The method of claim 12, wherein the method further comprises:
requesting a password from the portable terminal when a password input request for authenticating service users who can receive desired contents from a web server is generated according to the contents request; and
providing the password to the web server and authenticating the service user when the password is provided to the portable terminal.

16. The method of claim 15, wherein when it is determined that the corresponding user is a service user according to the password provided by the portable terminal in the step of providing the contents, the web server provides the contents to the user.

17. A method comprising:
at a data server, receiving two or more URLs that are transmitted from a portable terminal, the portable terminal including a plurality of channel icons that respectively have channel URL information of a predetermined subject and wherein a user selection of a channel icon of the portable terminal causes the two or more URLS to be transmitted from the portable terminal to the data server, wherein the two or more uniform resource locators (URLs) are associated with a set of URLs, each URL of the set corresponding to a web server that provides contents of a predetermined subject;
at the data server, requesting contents from a plurality of web servers associated with the two or more URLs associated with the selected channel, and binding the contents into a single channel; and
at the data server, transmitting the single channel of contents to the portable terminal.

18. The method of claim 17 wherein the data server transmits the single channel of contents to the portable terminal at one time.

19. An apparatus comprising:
a data server to receive two or more URLs that are transmitted from a portable terminal, the portable terminal including a plurality of channel icons that respectively have channel URL information of a predetermined subject and wherein a user selection of a channel icon of the portable terminal causes the two or more URLs to be transmitted from the portable terminal to the data server, wherein the two or more uniform resource locators (URLs) are associated with a set of URLS, each URL of the set corresponding to a web server that provides contents of a predetermined subject;
request contents from a plurality of web servers associated with the two or more URLs associated with the selected channel,
bind the contents into a single channel, and
transmit the single channel of contents to the portable terminal.

20. The apparatus of claim 19 wherein the data server is to transmit the single channel of contents to the portable terminal at one time.

* * * * *